United States Patent
Lawrence et al.

(10) Patent No.: US 12,477,232 B2
(45) Date of Patent: Nov. 18, 2025

(54) INFRARED LIGHT-GUIDED PORTRAIT RELIGHTING

(71) Applicant: GOOGLE LLC, Mountain View, CA (US)

(72) Inventors: Jason Lawrence, Seattle, WA (US); Supreeth Achar, Seattle, WA (US); Zhihao Xia, St. Louis, MO (US)

(73) Assignee: GOOGLE LLC, Mountain View, CA (US)

( * ) Notice: Subject to any disclaimer, the term of this patent is extended or adjusted under 35 U.S.C. 154(b) by 166 days.

(21) Appl. No.: 17/754,626

(22) PCT Filed: Apr. 8, 2021

(86) PCT No.: PCT/US2021/070361
§ 371 (c)(1),
(2) Date: Apr. 7, 2022

(87) PCT Pub. No.: WO2022/099227
PCT Pub. Date: May 12, 2022

(65) Prior Publication Data
US 2023/0088801 A1    Mar. 23, 2023

Related U.S. Application Data

(60) Provisional application No. 63/198,736, filed on Nov. 9, 2020, provisional application No. 63/198,836, filed on Nov. 16, 2020.

(51) Int. Cl.
*H04N 23/72* (2023.01)
*G06T 5/50* (2006.01)
(Continued)

(52) U.S. Cl.
CPC .............. *H04N 23/72* (2023.01); *G06T 5/50* (2013.01); *G06T 5/70* (2024.01); *H04N 9/646* (2013.01);
(Continued)

(58) Field of Classification Search
CPC ........ H04N 23/72; H04N 23/74; H04N 23/76; H04N 23/56; H04N 23/11; H04N 23/84;
(Continued)

(56) References Cited

U.S. PATENT DOCUMENTS 9,741,161 B2    8/2017  Schroecker
9,842,507 B1 *  12/2017 Borenstein ............... G09B 5/06
(Continued)

FOREIGN PATENT DOCUMENTS

CN    110663045 A    1/2020
CN    110706178 A    1/2020
(Continued)

OTHER PUBLICATIONS

International Search Report and Written Opinion for PCT Application No. PCT/US2021/070361, mailed on Nov. 29, 2021, 12 pages.
(Continued)

*Primary Examiner* — Dave Czekaj
*Assistant Examiner* — Shanika M Brumfield
(74) *Attorney, Agent, or Firm* — Brake Hughes Bellermann LLP

(57) ABSTRACT

An imaging system includes a processor, a memory, a visible light camera configured to record a first image of a scene, and an infrared camera configured to record a second image of the scene. The processor configured to execute instructions stored in the memory to input the first image and the second image into a neural network. The neural network relights the first image, based on characteristics of the
(Continued)

second image, to correspond to an image of the scene under canonical illumination conditions.

21 Claims, 13 Drawing Sheets

(51) Int. Cl.
| | |
|---|---|
| *G06T 5/70* | (2024.01) |
| *H04N 9/64* | (2023.01) |
| *H04N 23/11* | (2023.01) |
| *H04N 23/20* | (2023.01) |
| *H04N 23/56* | (2023.01) |
| *H04N 23/74* | (2023.01) |
| *H04N 23/76* | (2023.01) |
| *H04N 23/84* | (2023.01) |

(52) U.S. Cl.
CPC ............. *H04N 23/11* (2023.01); *H04N 23/20* (2023.01); *H04N 23/56* (2023.01); *H04N 23/74* (2023.01); *H04N 23/76* (2023.01); *H04N 23/84* (2023.01); *G06T 2207/10012* (2013.01); *G06T 2207/10024* (2013.01); *G06T 2207/10048* (2013.01); *G06T 2207/10152* (2013.01); *G06T 2207/20081* (2013.01); *G06T 2207/20084* (2013.01); *G06T 2207/20212* (2013.01)

(58) Field of Classification Search
CPC ........ H04N 23/646; G06T 2207/10012; G06T 2207/10024; G06T 2207/10048; G06T 2207/10152; G06T 2207/20081; G06T 2207/20084; G06T 2207/20212; G06T 5/50; G06T 5/70
See application file for complete search history.

(56) References Cited

U.S. PATENT DOCUMENTS

| | | | |
|---|---|---|---|
| 10,360,664 | B2 | 7/2019 | Lee et al. |
| 10,719,704 | B2 | 7/2020 | Yamamoto et al. |
| 10,922,799 | B2 | 2/2021 | Hiasa |
| 10,956,716 | B2 | 3/2021 | Martin et al. |
| 11,210,768 | B2 | 12/2021 | Cardei |
| 11,250,550 | B2 | 2/2022 | Luo et al. |
| 11,615,505 | B2 | 3/2023 | Navarrete Michelini et al. |
| 11,887,224 | B2 | 1/2024 | Kang et al. |
| 2012/0224019 | A1* | 9/2012 | Samadani ............... H04N 23/13 348/14.01 |
| 2015/0062347 | A1* | 3/2015 | Jin ....................... H04N 25/135 348/164 |
| 2018/0134127 | A1 | 5/2018 | Winn et al. |
| 2019/0043178 | A1* | 2/2019 | Chen .......................... G06T 1/20 |
| 2019/0200002 | A1 | 6/2019 | Liu et al. |
| 2019/0340810 | A1* | 11/2019 | Sunkavalli ............ G06T 15/506 |
| 2020/0077076 | A1 | 3/2020 | Xue et al. |
| 2020/0334476 | A1 | 10/2020 | Wang et al. |
| 2021/0295571 | A1* | 9/2021 | Sun ........................... G06T 5/94 |

FOREIGN PATENT DOCUMENTS

| | | | |
|---|---|---|---|
| CN | 110889813 | A | 3/2020 |
| CN | 111104889 | A | 5/2020 |
| CN | 111815750 | A | 10/2020 |
| CN | 111968039 | A | 11/2020 |
| JP | 2017097645 | A | 6/2017 |
| JP | 2019016275 | A | 1/2019 |
| JP | 2019121252 | A | 7/2019 |
| JP | 2019139694 | A | 8/2019 |
| KR | 20140067160 | A | 6/2014 |
| KR | 20170044703 | A | 4/2017 |
| KR | 101871098 | B1 | 6/2018 |
| KR | 20190109710 | A | 9/2019 |
| KR | 20200054355 | A | 5/2020 |
| KR | 20200073267 | A | 6/2020 |
| WO | 2013052383 | A1 | 4/2013 |
| WO | 2019153920 | A1 | 8/2019 |
| WO | 2020068158 | A1 | 4/2020 |
| WO | 2020236206 | A1 | 11/2020 |

OTHER PUBLICATIONS

Gunawardane, et al., "Invisible Light: Using Infrared for Video Conference Relighting", 17th IEEE International Conference on Image Processing (ICIP 2010);, Sep. 26, 2010, 4 pages.
Xia, et al., "A Dark Flash Normal Camera", arxiv.org; Cornell University Library; arXiv:2012.06125v1;, Dec. 11, 2020, 15 pages.
Chen, et al., "A Neural Rendering Framework for Free-Viewpoint Relighting", 2020 IEEE/CVF Conference on Computer Vision and Pattern Recognition (CVPR), Aug. 5, 2020.
Mao, et al., "Neural Network Based Color Image Enhancement Algorithm in Low Illumination", Optical Technique, No. 2, Mar. 15, 2010.
Sun, et al., "Single Image Portrait Relighting", ACM Trans. Graph, vol. 38, No. 4, Article 79, Jul. 2019, https://arxiv.org/pdf/1905.00824, 12 pages.
Zendagui, et al., "Quality Assessment of Reconstruction and Relighting from RTI Images: Application to Manufactured Surfaces", 2019 15th International Conference on Signal-Image Technology & Internet-Based Systems (SITIS), Apr. 16, 2020.
Zhang, et al., "Neural Light Transport for Relighting and View Synthesis", https://arxiv.org/pdf/2008.03806, Aug. 9, 2020, 16 pages.

* cited by examiner

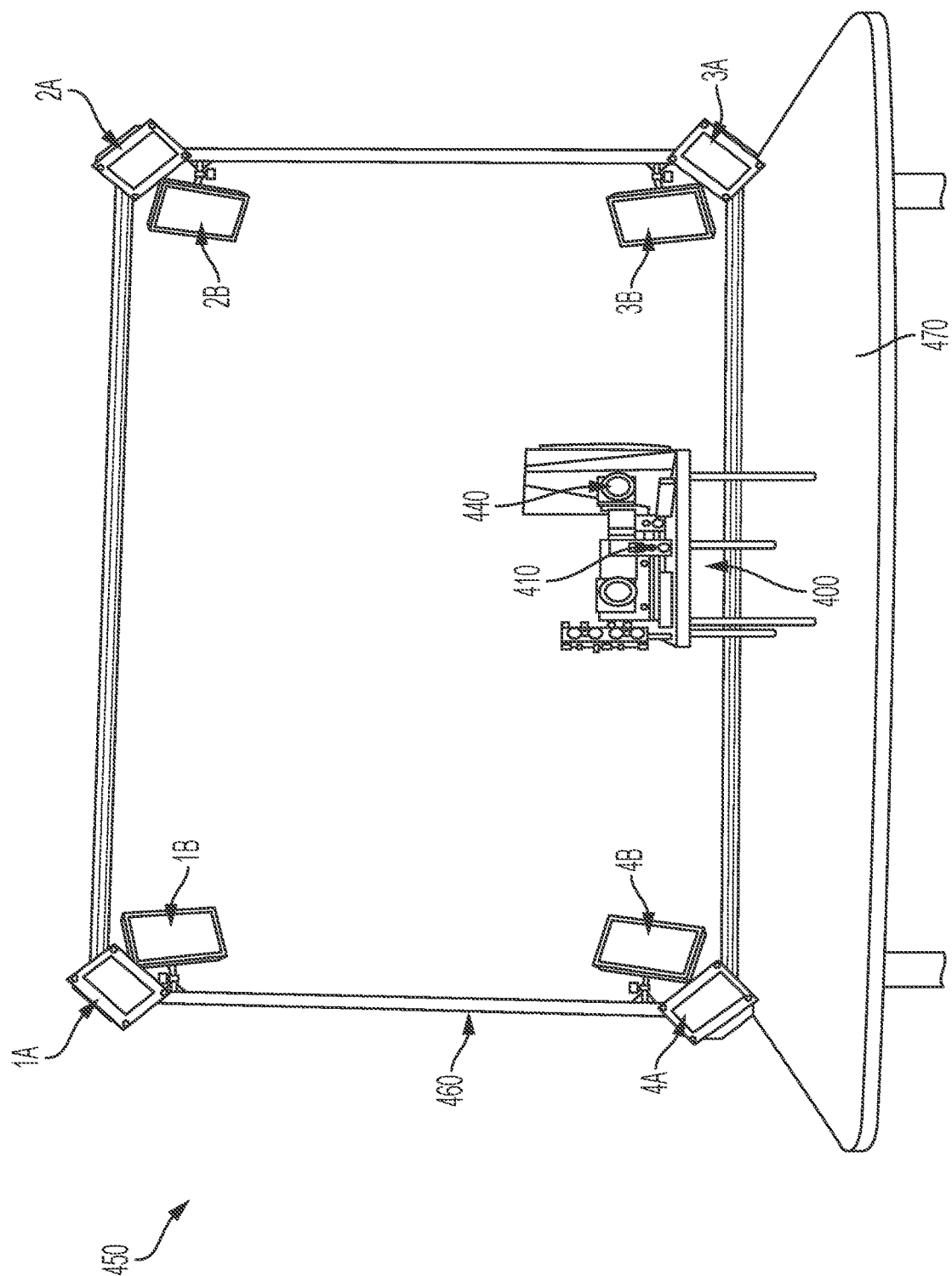

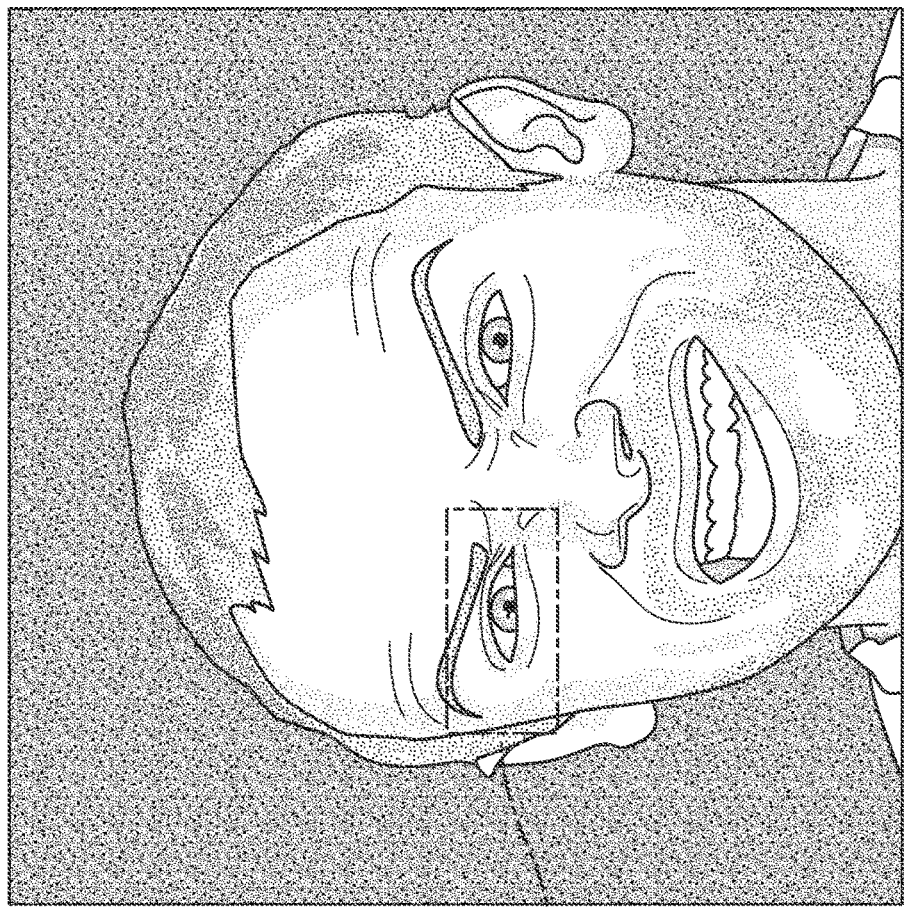
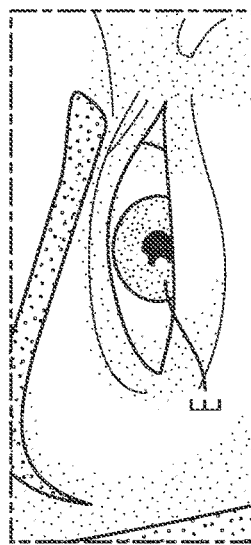
FIG. 6E
FIG. 6F

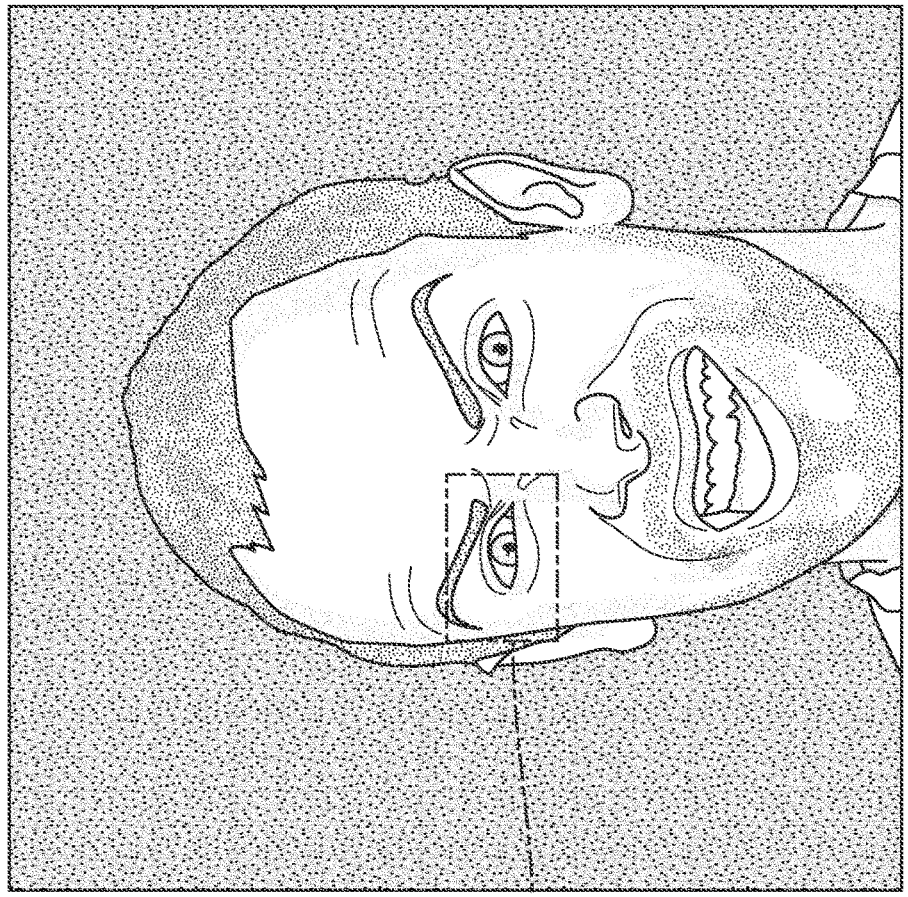
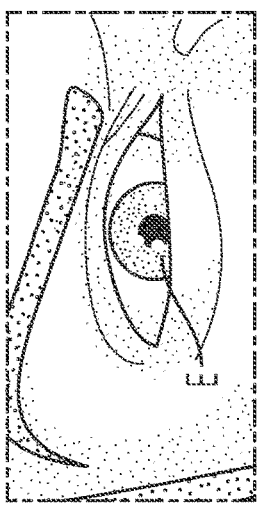
FIG. 6G
FIG. 6H

INFRARED LIGHT-GUIDED PORTRAIT RELIGHTING

CROSS REFERENCE TO RELATED APPLICATIONS

This application is a 35 U.S.C. § 371 National Phase Entry Application from PCT/US2021/070361, filed Apr. 8, 2021, designating the U.S., and claims the benefit of U.S. Provisional Application No. 63/198,736, filed Nov. 9, 2020 and U.S. Provisional Application No. 63/198,836, filed Nov. 16, 2020, the disclosures of which are incorporated herein by reference in their entireties.

TECHNICAL FIELD

This description relates to electronic imaging, and in particular, to photographic lighting for imaging scenes and portraits.

BACKGROUND

Digital photography uses cameras containing arrays of electronic photodetectors to capture images focused by a lens. The captured images are digitized and stored as a computer file ready for further digital processing, viewing, electronic publishing, or digital printing. A digital image or photograph simply records patterns of light, color, and shade; lighting is all-important in controlling the quality of the image. Proper illumination is required to capture images that are properly exposed not too dark or washed out), have the right colors and shades, and are not afflicted with lighting artifacts (e.g., shadows, flash reflections or streaks, etc.). In some types of photography (e.g., portrait photography), elaborate or complex lighting setups (e.g., a 3-point lighting setup) have been traditionally used (e.g., in a studio setting by professional photographers) to controllably light a subject's face for quality image renditions of the subject's face. Consumer digital cameras (e.g., integrated with smartphones) are now ubiquitous in the hands of ordinary consumers (i.e., non-professional photographers). The digital camera phone has changed notions of traditional photography, mostly because it is easier to carry around a camera phone that fits in a person's pocket. Users now freely take photographs of scenes (including, e.g., portraits) using the digital cameras under all sorts of uncontrolled illumination conditions. For digital camera photography, illumination may be provided by an "on device" light source (e.g., a small light source/flash attached to the camera). For the digital camera photography, there remains a need for small size (e.g., pocket-size) lighting setups that can duplicate or simulate the traditional controlled lighting setups used for quality imaging in larger settings (e.g., in a studio setting by professional photographers).

SUMMARY

In a general aspect, an imaging system includes a visible light camera configured to record a first image of a scene, and an infrared camera configured to record a second image of the scene. The imaging system also includes a processor, and a memory. The imaging system can include or be coupled to a neural network. The processor is configured to execute instructions stored in the memory to input the first image and the second image into the neural network. The neural network relights the first image, based on characteristics of the second image, to correspond to an image of the scene under canonical illumination conditions. The canonical illumination conditions include a key light, a fill light, and a back light of a three-point lighting setup.

In an aspect, the imaging system includes an infrared light source configured to illuminate the scene with infrared illumination. The infrared light source can be collocated with a center of projection of the infrared camera. The visible light camera and the infrared camera can be collocated and have a same or overlapping fields of view.

In an aspect, the processor is configured to operate the visible light camera and the infrared camera to record the first image and the second image simultaneously in a single exposure period.

In an aspect, the neural network included in or coupled to the imaging system is a convolutional neural network (e.g., a U-Net). The neural network relights the first image by at least one of: removing shadows, removing specular artifacts, and synthesizing specular features.

In a general aspect, a computer-implemented method includes receiving a red-green-blue, RGB, image of a scene recorded by an RGB camera in a lighting environment, obtaining an infrared image of the scene recorded by an infrared camera under infrared light illumination of the scene, inputting both the RGB image and the infrared image of the scene into a neural network that relights the RGB image based on characteristics of the infrared image of the scene, and receiving the relighted RGB image as an output of neural network. The neural network relights the first image by at least one of: removing shadows, removing specular artifacts, and synthesizing specular features. In an aspect, obtaining the infrared image of the scene includes collocating the RGB camera and the infrared camera.

In an aspect, obtaining the infrared image of the scene includes recording the infrared image simultaneously as a recording of the RGB image of the scene by the RGB camera.

In an aspect, the neural network used in the computer-implemented method is trained by providing a light stage including multiple light sources to controllably illuminate scenes, providing a camera system including a visible light camera and an infrared camera to capture images of the scenes under controlled illumination conditions, and recording a set of training data images using the camera system for training the neural network. The training includes processing a pair of visible light and infrared images of a scene from the set of training data through the neural network to produce a relighted red-green-blue, RGB, image of the scene as an output image of the scene, and comparing the relighted RGB image output for the scene with a target canonical RGB image of the scene. The training further includes adjusting neural network parameters to reduce differences between the relighted RGB image output for the scene and the target canonical RGB image of the scene.

In a general aspect, a method for training a neural network to relight visible light images includes providing a light stage including multiple light sources to controllably illuminate scenes, providing a camera system including a visible light camera and an infrared camera to capture images of the scenes under controlled illumination conditions, and recording a set of training data images using the camera system. Training the neural network involves processing a pair of visible light and infrared images of a scene from the set of training data through the neural network to produce a relighted red-green-blue, RGB, image of the scene as an output image of the scene, comparing the relighted RGB image output for the scene with a target canonical RGB image of the scene, and adjusting neural network parameters to reduce differences between the relighted RGB image output for the scene and the target canonical RGB image of the scene.

In an aspect, recording the set of training data images includes adjusting the multiple light sources in the light stage to correspond to a canonical lighting environment for the scene, and recording the target canonical RGB image of the scene. Recording the set of training data images using the camera system can include turning on the multiple light sources in the light stage, one-by-one, and recording pairs of one-light-at-a-time, OLAT, RGB images and OLAT infrared images of the scene.

In an aspect, recording the set of training data images further includes combining a first OLAT RGB image of a scene obtained under illumination from one light source with a second RGB image or images obtained under illumination from a second light source or light sources to simulate a combined RGB image of the scene.

In an aspect, recording the set of training data images further includes combining all OLAT RGB images of a scene obtained under illumination from one light source with an RGB image or images obtained under illumination from other light sources to simulate a combined RGB image.

In an aspect, recording the set of training data images using the camera system further includes using the camera system includes recording RGB images and infrared images of a plurality of different scenes.

In an aspect, adjusting the neural network parameters to reduce differences between the relighted RGB image output for the scene and the target canonical RGB image of the scene involves evaluating a perceptual loss function.

In an aspect, adjusting the neural network parameters to reduce differences between the relighted RGB image output for the scene and the target canonical RGB image of the scene involves evaluating a least absolute error (L1) function.

BRIEF DESCRIPTION OF THE DRAWINGS

FIG. 4B is a schematic diagram illustrating an example light stage that can provide controlled lighting environments for collecting training data images.

FIGS. 6A through 6H show examples of images that may be used for training a neural network or are relighted images output by the trained neural network.

Figure 1:
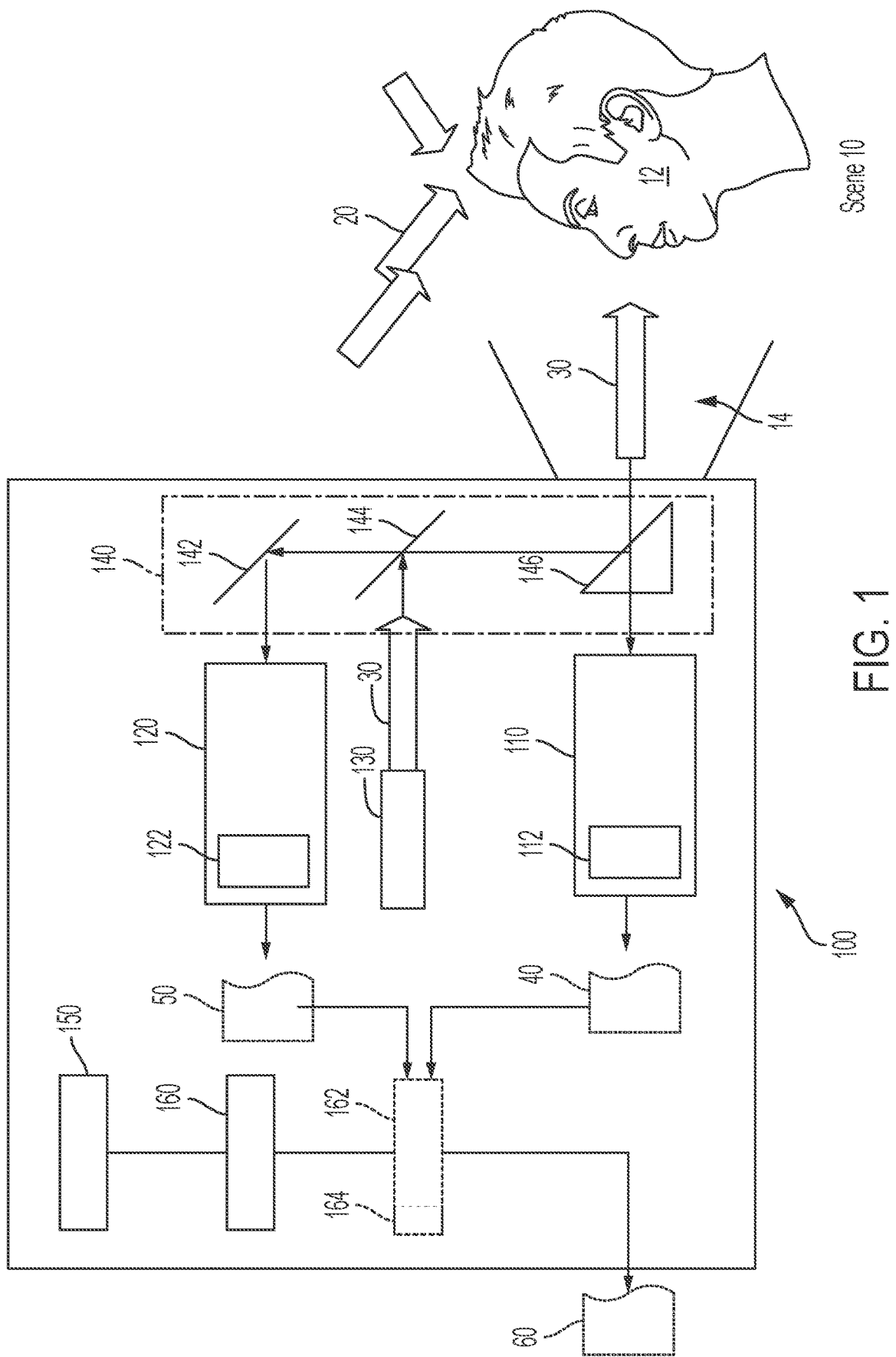
FIG. 1 is a block diagram illustrating an example imaging system used for reconstructing or relighting an RGB image of a scene, in accordance with the principles of the present disclosure.

It should be noted that the drawings are intended to illustrate the general characteristics of methods, structure, or materials utilized in certain example implementations and to supplement the written description provided below. The drawings, however, need not be to scale and may not precisely reflect the precise structural or performance characteristics of any given implementation, and should not be interpreted as defining or limiting the range of values or properties encompassed by example implementations. The use of similar or identical reference numbers in the various drawings is intended to indicate the presence of a similar or identical element or feature in the various drawings.

DETAILED DESCRIPTION

A digital image of scene (e.g., a portrait of a subject or a group of subjects) obtained under uncontrolled visible illumination (e.g., light in the visible wavelengths or in the red-green-blue (RGB) wavelengths) can be of a poor quality (in other words, be afflicted with lighting artifacts such as shadows, discolorations, un-even lighting, etc.). The terms "visible" and "RGB" may be used interchangeably herein (e.g., as in "visible light" or "RGB light", in "visible light image" or "RGB image", etc.). An RGB image may thus in particular relate to an image of visible light that may be encoded in different ways. For example, an RGB image may be encoded in the RGB color space but may be alternatively encoded using a luminance-chrominance format (such as YIQ, YUV, or YPbPr). The digital image (e.g., a portrait of a subject including, for example, the face, torso, and hands of the subject) obtained under uncontrolled visible illumination may contain illumination-related artifacts (e.g., uneven lighting of the subject's face, reflections from other surfaces, intensity spots, over- or under-saturated measurements, significant noise, color variations, specular streaks, flash glare or spots, shadows, and other lighting-related artifacts, etc.) that detract from the quality of the image as a desirable rendition (e.g., a rendition in accordance with aesthetic or artistic standards for portrait photography)) of the scene. In contrast to visible illumination, infrared illumination (e.g., near infrared (NIR) illumination) can be better or more easily controlled, for example, because of the simpler reflectance characteristics of infrared light from close by sources. Intensity variations in a digital image obtained under infrared illumination are more likely to represent variations in the scene more accurately than the intensity variations or color variations in the digital image obtained under uncontrolled visible illumination. Further, NIR illumination can be more easily controlled in imaging scenarios, for example, because ambient or background NIR light sources are generally absent in many indoor environments. Also, supplementing a scene with NIR light sources can be less disruptive than using visible light flash sources.

Systems and methods for enhancing the quality of an image obtained under uncontrolled visible illumination are disclosed herein. The proposed solution may, for example, allow for providing images of a scene that are objectively better or even of professional quality even if the imaging device used for capturing the image does not allow for controlling a visible illumination of the scene.

The disclosed systems and methods may involve reconstructing (relighting) a first digital image ("visible light image" or "RGB image") obtained under uncontrolled or arbitrary, visible illumination of a scene using characteristics of a second digital image ("infrared image") obtained under infrared illumination (e.g., NIR illumination) of the scene. The first digital image may be a black-and white image or a color image, but in either case, for simplicity in description, may be referred to herein as the visible light image or the RGB image. Obtaining the first digital image under uncontrolled (or partially controlled) visible illumination may for example relate to capture the first image without controlling illumination of a captured scene by at least one illumination source. For example, an imaging system comprising a camera for obtaining the first image may not even include or be coupled to an artificial illumination source. Further, for example, an artificial illumination source even if used to illuminate the scene may not fully or only partially (e.g., only from one side) illuminate the scene. Computer-implemented algorithms may be used to reconstruct the RGB image taken under the uncontrolled visible illumination to obtain a relighted RGB image of the scene. The reconstruction may, for example, involve removing lighting artifacts such as shadows or reflection spots, and/or correcting features obscured by the lighting artifacts. The algorithms may be dependent on characteristics of the infrared image of the scene. The reconstructed or relighted RGB image may be an image of the scene that would be obtained under illumination from a canonical set of visible lights. The term "canonical" illumination as used herein may refer to illumination conforming to a predetermined standard or acceptable procedure for photography (e.g., for professional quality portrait photography). Canonical illumination conditions may refer to illumination conditions provided by a predetermined canonical set of lights.

In example implementations, machine learning techniques may be used to train (i.e., determine) a neural network for reconstructing or relighting the RGB image of the scene based on the infrared image of the scene. The neural network may be trained on a set of training data images (including both RGB and infrared images). In example implementations, the neural network may be a feedforward "deep" neural network. In example implementations, the set of training data images may include images of scenes obtained under point illumination from a set of visible or RGB lights (e.g., a canonical set of RGB lights) activated "one-light-at-a-time" (OLAT). The neural network trained for relighting the RGB image under the canonical set of RGB lights may be referred to herein as the "canonical relighting" neural network.

In example implementations, both a RGB image of a scene taken under uncontrolled RGB illumination and an infrared image of the scene obtained under infrared illumination may be input in to, the canonical relighting neural network. Then, the canonical relighting neural network parameters (e.g., weights of different network layers) may be applied to the RGB image to generate a reconstructed or relighted RGB image of the scene that would be have been obtained under the canonical set of visible or RGB lights. The infrared illumination may be controlled (compared to the uncontrolled and thus arbitrary RGB illumination), for example by using at least one infrared light source of an imaging system. The imaging system may include an infrared camera in addition to the RGB camera.

For reconstruction or relighting, the canonical relighting neural network may be applied to an entire image or a portion of the image (e.g. a region determined by some type of image segmentation algorithm). In example implementations, the canonical relighting neural network may include, or be coupled to, a portion corresponding to a convolutional neural network (e.g., a U-Net) developed for image segmentation (i.e., a process of assigning a label to every pixel in an image such that pixels with the same label share certain characteristics). Both the RGB image of the scene taken under uncontrolled RGB illumination and the infrared image of the scene obtained under infrared illumination may be input to the U-Net portion of the canonical relighting neural network for image segmentation. Then, the canonical relighting neural network parameters (e.g., weights of different network layers) may be applied to the segmented RGB image to generate a reconstructed or relighted RGB image of the scene that would be have been obtained under the canonical set of visible or RGB lights.

FIG. 1 is a block diagram illustrating an example imaging system 100 that may be used for reconstructing or relighting an RGB image of a scene, in accordance with the principles of the present disclosure. Imaging system 100 may be configured to take images, for example, of a scene 10 (e.g., portrait images a subject 12) under arbitrary, thus, e.g., poor, weak, and/or undesirable lighting conditions (e.g., visible light 20).

Imaging system 100 may include a processor 150, a memory 160, a visible light camera 110, an infrared camera 120, and an infrared light source 130. In some implementations, one or more pairs of the components: visible light camera 110, infrared camera 120, and infrared light source 130, may be collocated (in other words, have the same (or about the same) center of projection and the same (or about the same) optical axis") to have the same centers of projections (or about the same centers of projection). The collocated pairs of components (e.g., visible light camera 110 and infrared camera 120) having the same or about the same centers of projection may have equal or overlapping fields of view. The collocated pairs of components (e.g., visible light camera 110 and infrared camera 120) may have equal or overlapping fields of view. In some example implementations, one or more pairs of the components (e.g., visible light camera 110 and infrared light source 130) may not be collocated to have the same or about the same centers of projections, but yet may have at least overlapping fields of view. In some implementations, functions of visible light camera 110 and infrared camera 120 may be combined in a single camera unit.

Processor 150 may be configured to execute instructions stored, for example, in memory 160, to implement a neural network (e.g., neural network 162) for processing images. The neural network may be a trained canonical relighting neural network.

Visible light camera 110 may include a visible light sensor (e.g., an RGB color sensor 112) capable of recording visible light images (e.g., visible light image 40) of scene 10. Infrared camera 120 may include an infrared light sensor (e.g., a near-infrared (NIR) sensor 122) capable of recording infrared images (e.g., infrared image 50) of scene 10. In example implementations, the visible and infrared image recording functions of the visible light sensor (e.g., RGB color sensor 112) and the infrared light sensor (e.g., NIR sensor 122) may be provided by a single solid-state sensor (not shown) capable of recording both visible and infrared images. In some example implementations, as shown in FIG. 1, visible light camera 110 and infrared camera 120 may be collocated (i.e., have a same field of view 14 of scene 10). An assembly 140 of optical elements (e.g., a reflector 142, a reflector 144, beam splitter 146, etc.) may be used to redirect light beams to and from infrared camera 120 to achieve collocation with visible light camera 110. In other example implementations, visible light camera 110 and infrared camera 120 may not be collocated (i.e., have different fields of view of scene 10) (not shown).

In imaging system 100, infrared light source 130 may, for example, be an infrared light emitting diode (LED) or other device capable of generating infrared light (e.g., infrared light 30) to illuminate scene 10. In some example implementations, infrared light source 130 may be placed next to infrared camera 120. In some example implementations, infrared light source 130 may be collocated with the IR camera's center of projection, for example, through the use of a beam splitter or other optical device. In some example implementations, as shown in FIG. 1, both infrared light source 130 and infrared camera 120 may be collocated with visible light camera 110.

In example implementations, imaging system 100 may be operated (e.g., by processor 150) to capture a pair of visual and infrared images (e.g., visible light image 40, and infrared image 50) of scene 10 using the hardware components (e.g., camera 110 and camera 120) of imaging system 100 described above. In some example implementations, visible light image 40 and infrared image 50 may be recorded simultaneously in a single exposure. In some example implementations, visible light image 40 and infrared image 50 need not be recorded simultaneously in a single exposure, but may be recorded in temporally proximate exposures at different times (e.g., successive exposures). An acceptable time difference may depend on the stillness or stationariness of the imaged scene. Motion compensation or optical flow algorithms may be applied to correct for any motion in the scene that does occur between these successive exposures. The pair of visual and infrared images (e.g., visible light image 40, and infrared image 50) may be input into neural network 162. In example implementations, canonical relighting neural network parameters (e.g., weights of different network layers) may be applied to reconstruct visible light image 40 as a reconstructed or relighted visible light image 60 of the scene that would be obtained under the canonical set of visible lights of the scene. In example implementations, the canonical set of visible lights for illuminating the scene may be based on principles of professional portrait photography, and include, for example, aesthetically pleasing "three-point lighting" that balances rim, fill, and key light sources.

In some implementations, neural network 162 may include, or be coupled to, segmentation algorithms or a neural network portion (e.g., U-Net 164) for image segmentation. U-Net 164 may, for example, be a convolutional neural network developed for image segmentation (i.e., a process of assigning a label to every pixel in an image such that pixels with the same label share certain characteristics). Visible light image 40 and infrared image 50 input into neural network 162 for relighting may be first processed, and segmented by, the segmentation algorithms or the neural network portion (e.g., U-Net 164). The canonical relighting neural network parameters (e.g., weights of different network layers) of neural network 162 may be then applied to the image segments to relight the input (visible light image 40) as relighted visible light image 60.

System 100 may be incorporated in, or integrated with, any consumer electronic imaging device (e.g., digital cameras, camcorders, digital television sets, personal computers, and numerous personal devices including smart phones, smart glasses, etc.).

Figure 2:
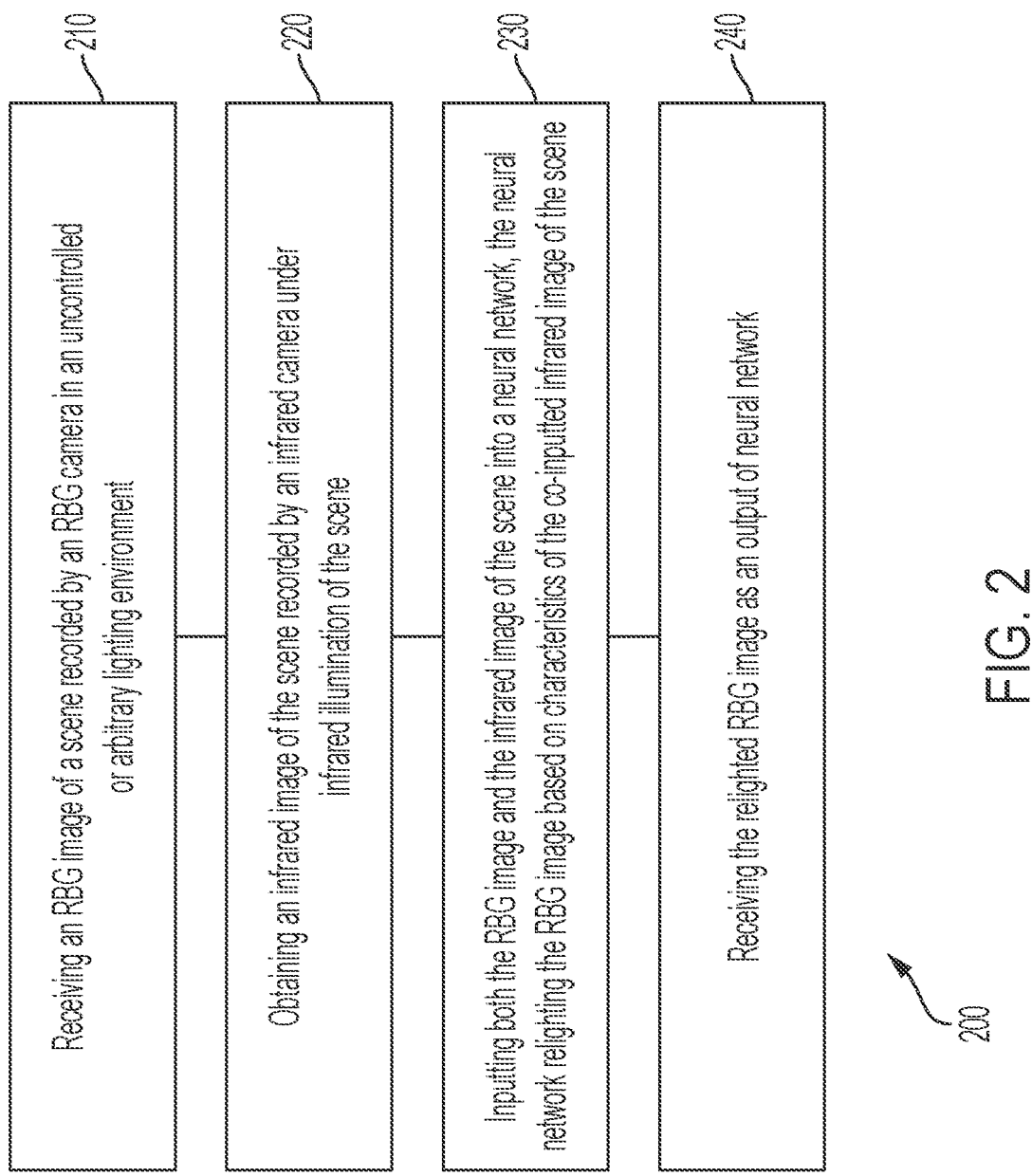
FIG. 2 illustrates an example method for relighting an RGB image of a scene recorded by an RGB camera in an uncontrolled or arbitrary lighting environment.

FIG. 2 illustrates an example method 200 for relighting an RGB image of a scene recorded by an RGB camera in an uncontrolled or arbitrary lighting environment. In example implementations, method 200 may be implemented, for example, on system 100 (FIG. 1).

Method 200 includes receiving an RGB image of a scene recorded by an RGB camera in an uncontrolled or arbitrary lighting environment (210), and obtaining an infrared image of the scene recorded by an infrared camera under infrared illumination from an infrared source (220). The infrared source may be positioned close to the infrared camera and configured to illuminate the scene with infrared light. In some implementations, obtaining an infrared image 210 may include collocating the RGB camera and the infrared camera. Further, obtaining the infrared image 210 may include collocating the infrared source with the RGB camera and or the infrared camera.

Further, obtaining the infrared image 210 may include recording the infrared image simultaneously, or at about the same time, as the recording of the RGB image of the scene. In example implementations, the RGB image and the infrared image may be captured or recorded in a single exposure period by the RGB camera and the infrared camera.

Method 200 further includes inputting both the RGB image and the infrared image into a neural network (230). The neural network (e.g., a U-net) may be trained to relight the RGB image based on characteristics (e.g., geometry characteristics or features) of the co-inputted infrared image of the scene. For this purpose (i.e., relighting the RGB image) the relevant characteristics of the co-inputted infrared image may, for example, be geometric features of the scene identified in the infrared image.

Method 200 further includes receiving the relighted RGB image as an output of neural network (240). In example implementations, the relighted RGB image output by the trained neural network may show the scene re-rendered under a canonical lighting environment. The canonical lighting environment may be one designed according to principles of portrait photography (e.g., including an aesthetically pleasing "three-point lighting" setup that balances rim, fill, and key light sources).

As previously mentioned, the canonical relighting neural network (e.g., neural network 162) used in system 100 (and or in method 200) may be obtained by training a neural network on a set of training data images.

Figure 3:
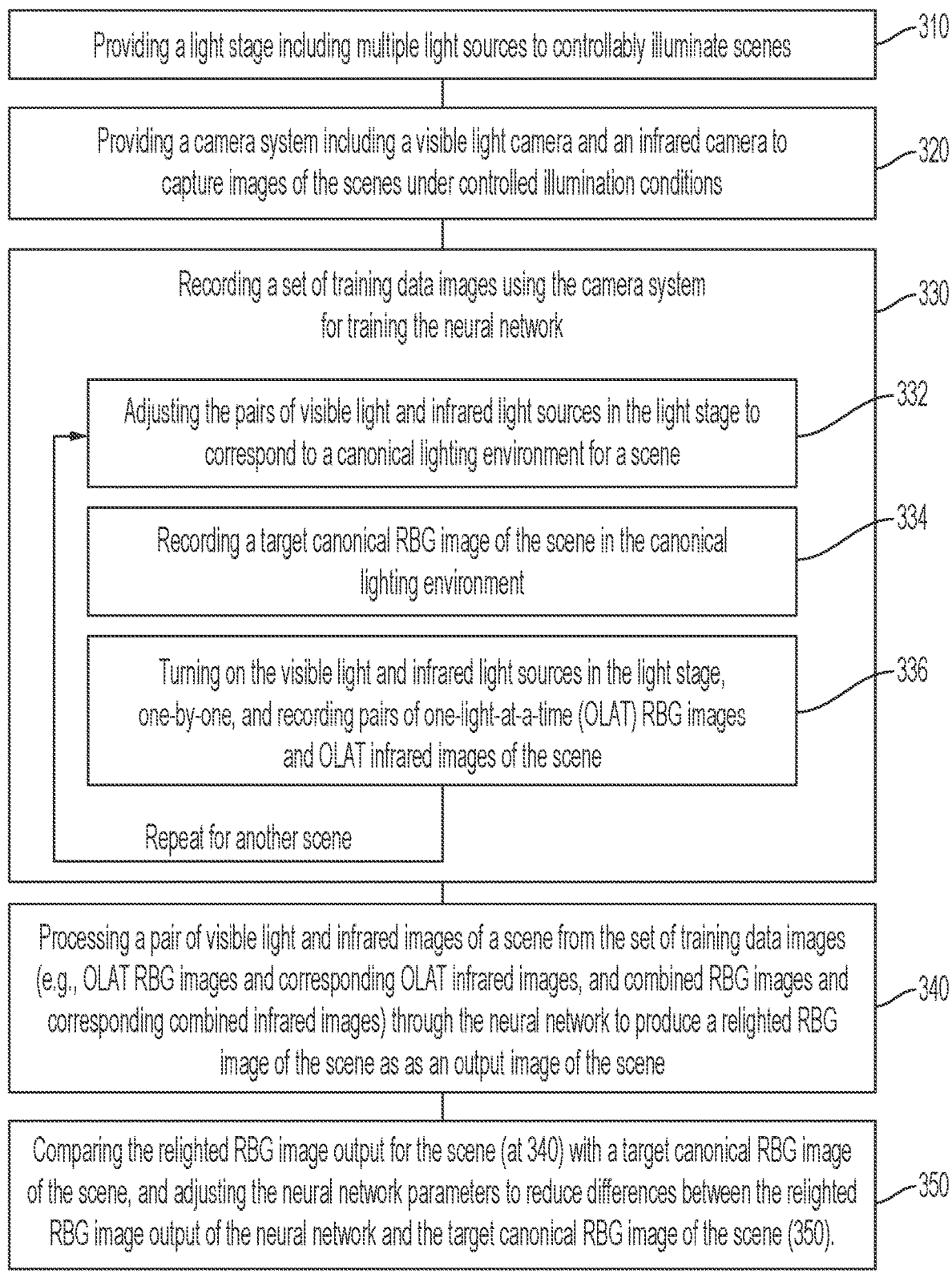
FIG. 3 illustrates an example method for training a neural network to process visible light images for relighting.

FIG. 3 shows an example method 300 for training a neural network to process visible light images for relighting. The resulting trained neural network may receive, for example, an RGB image of a scene (e.g., a human subject or a group of subjects) obtained under uncontrolled or arbitrary lighting conditions, as an input, and output a relighted RGB image corresponding to a canonical lighting environment (e.g., a lighting environment based on principles of professional portrait photography). The canonical lighting environment may for example, include balanced, fill, and key lighting sources for "three-point lighting" of the portrait subjects. The neural network may be trained, for example, on a set of training data images. The set of training data images may include RGB images and infrared images of a plurality of scenes.

Example method 300 may include providing a light stage including multiple light sources to controllably illuminate scenes (310), and providing a camera system including a visible light camera and an infrared camera to capture images of the scenes under controlled illumination conditions (320); and recording a set of training data images using the camera system for training the neural network (330). The set of training data images may include pairs of RGB and infrared images of each of the scenes.

In method 300, the light stage (provided at step 310) may include pairs of visible light and infrared light sources configured to illuminate the scene. Each pair of visible light and infrared light sources may illuminate a scene from a different respective angle or orientation, or with a different intensity. Each of the light sources in the light stage may be configured to be individually turned on, or off, to illuminate the scene. In example implementations, the light stage may, for example, include four pairs of visible light and infrared light sources.

In method 300, providing a camera system 320 may include providing a camera system including a collocated visible light camera and an infrared camera (e.g., cameras having a same field of view).

Figure 4A:
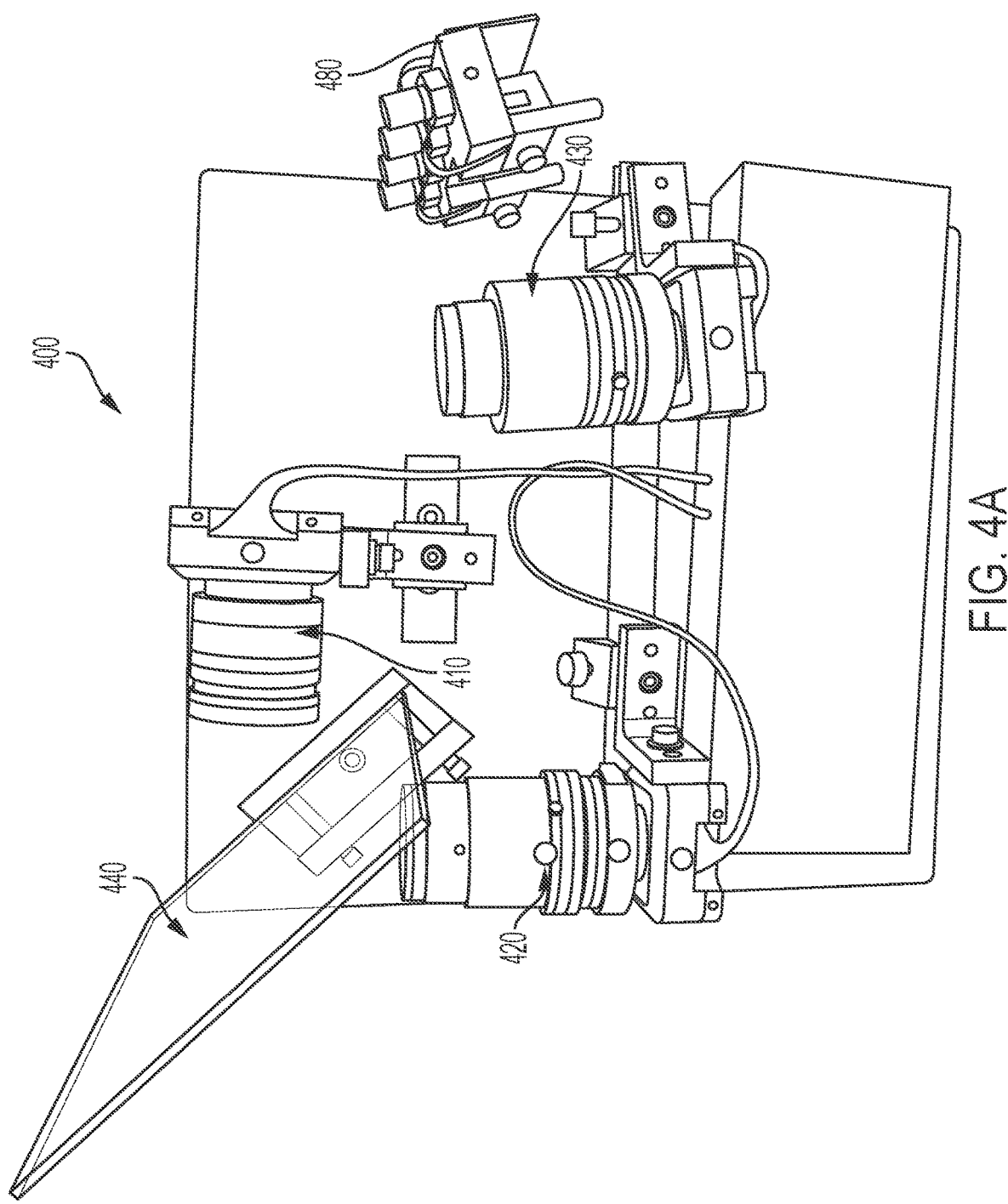
FIG. 4A is a schematic diagram illustrating an example camera system.

FIGS. 4A and 4B show an example camera system (e.g., camera system 400), and an example light stage (e.g., light stage 450) that may be provided at steps 310 and 320 of method 300.

FIG. 4A is a picture illustrating example camera system 400. Camera system 400 may include a visible light camera 410, an infrared camera 420, and a secondary infrared camera 430. In some implementations, camera system may include a light calibration unit (e.g., light calibration unit 480). In the example shown, visible light camera 410 and infrared camera 420 are collocated using, for example, beam splitter 440, to have a same or overlapping fields of view. The collocated visible light camera 410 and infrared camera 420 can be used to collect the visible light images and infrared images of the scene (e.g., human subjects) for inclusion in the set of training data images. In example implementations, the training data images can be collected under visible light illumination and infrared illumination in controlled lighting environments provided by a light stage (light stage 450, FIG. 4B).

FIG. 4B is a picture illustrating example light stage 450 that can provide controlled lighting environments for collecting the training data images.

Light stage 450 may include a rectangular frame 460 mounted vertically on a table 470. Vertical rectangular frame 460 may be positioned behind and around camera system 400 (FIG. 4A) on a table (e.g., table 470). A subject (not shown) may be seated or standing in front of table 470 facing vertical frame 460 and camera system 400. Light stage 450 may include several light sources (e.g., four pairs of visible light (VL) sources and near infrared (NIR) light sources) capable of illuminating the subject in the field of view of camera system 400 from different angles or orientations. In example implementations, as shown in FIG. 4B, four pairs of VL sources and NIR light sources (e.g., pair (VL 1A, NIR 1B); pair (VL 2A, NIR 2B); pair (VL 3A, NIR 3B); and pair (VL 4A, NIR 4B)) may be affixed to four corners of frame 460. Light stage 450 may be configured so that the individual VL sources and NIR sources can be turned on (e.g., programmatically) one-light-at-a-time (OLAT) to illuminate the subject in the field of view of camera system 400.

With renewed reference to FIG. 3, in method 300, recording the set of training data images using the camera system for training the neural network 330 may include adjusting the pairs of visible light and infrared light sources in the light stage to correspond to a canonical lighting environment for a scene (332), and recording a target canonical RGB image of the scene in the canonical lighting environment (334). Recording the target canonical RGB image of the scene may also include recording a canonical infrared image in the canonical lighting environment. The target canonical RGB image obtained at 334 may be included in the set of training data images. In some implementations, the canonical infrared image may also be included in the set of training data images.

Recording the set of training data images using the camera system for training the neural network 330 may further include turning on the visible light and infrared light sources in the light stage, one-by-one, and recording pairs of one-light-at-a-time (OLAT) RGB images and OLAT infrared images of the scene (336) (e.g., using the collocated RGB and infrared cameras). One or more of the pairs of OLAT RGB images and OLAT infrared images obtained at 336 may be included in the set of training data images.

An example set of training data images may include about 350 pairs of the OLAT RGB images and OLAT infrared images of the scene (a human subject) collected under illumination by a light stage (e.g., light stage 450, FIG. 4B) that includes multiple light sources.

Recording the set of training data images using the camera system for training the neural network 330 may further include repeating steps 332 to 336 to record RGB images and infrared images of another of a plurality of different scenes (e.g., different human subjects). The target canonical RGB image, OLAT RGB images and OLAT infrared images of another scene may be included in the set of training data images. In example implementations, images of about 5 to 20 different scenes (e.g., 5 to 20 different human subjects) may be included in the set of training data images. In some example implementations, an RGB image (OLAT RGB image) of a scene obtained under illumination from one light source may be combined with an RGB image or images obtained under illumination from a second light source or light sources to simulate an RGB image (combined RGB image) that would be obtained under uncontrolled or arbitrary lighting conditions. Similarly, an infrared image (OLAT infrared image) obtained under illumination from one light source may be combined with an infrared image or images obtained under illumination from other light sources to simulate an infrared image (combined infrared image) that would be obtained under arbitrary lighting conditions. The combined RGB images and the combined infrared images of the scenes may be included in the set of training data images.

Method 300 further includes processing a pair of visible and infrared images of a scene from the set of training data images (e.g., OLAT RGB images and corresponding OLAT infrared images, and combined RGB images and corresponding combined infrared images) through the neural network to produce a relighted RGB image of the scene as an output image of the scene (340). The neural network may process the input pair of images (received at an input network layer) through intermediate network layers to produce the output image at an output layer of the network. Each of the network layers may be characterized by network parameters including, for example, weights, bias, and activation functions for the network layer.

Method 300 may further include comparing the relighted RGB image output for the scene (at 340) with target canonical RGB image of the scene, and adjusting the neural network parameters to reduce differences between the relighted RGB image output of the neural network and the target canonical RGB image of the scene (350).

In some example implementations, comparing the relighted RGB image output with target canonical RGB image of the scene at 350 may involve evaluating perceptual loss functions and/or the least absolute error (L1) function.

In some example implementations, adjusting the neural network parameters at 350 may include adjusting network layer or model parameters (e.g., weights, bias, and activation functions) for each network layer.

For relighting images, the neural network may be trained to remove shadows, remove unwanted specular highlights or artifacts (due to uneven lighting), and synthesize plausible specular highlights or features (e.g., eyes).

FIGS. 5A through 5E, and FIGS. 6A through 6H show examples of images that may be used for training the disclosed neural network or are relighted images output by the trained neural network (e.g., according to method 300).

Some of the images shown may have been acquired, for example, using the apparatus of FIGS. 4A and 4B, for inclusion in the set of training data images for the neural network.

Figure 5B:
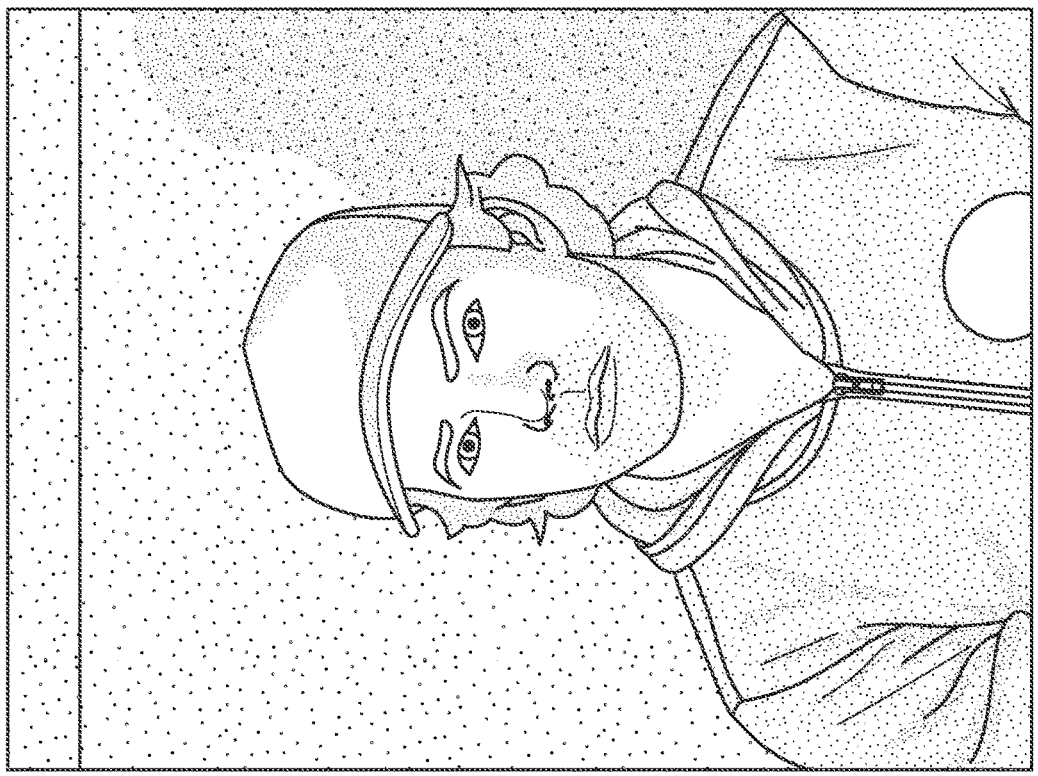
FIGS. 5A through 5E illustrate examples of images that may be used for training a neural network or are relighted images output by the trained neural network.
Figure 5A:

FIG. 5A shows, for example, an OLAT RGB image 500A of a subject that may be included in the set of training data images. FIG. 5B shows, for example, a corresponding OLAT infrared image 500B of the subject of FIG. 5A. In the example shown in FIGS. 5A and 5B, OLAT RGB image 500A includes regions with shadows (e.g., shadows A) that may have been caused, for example, by uneven lighting. The corresponding OLAT infrared image 500B shows fewer corresponding regions with shadows or at least that the corresponding region have shadows that are less intense than in OLAT RGB image 500A.

Figure 5D:
Figure 5C:

FIG. 5C shows, for example, a combined RGB image 500C of a subject obtained by combining several OLAT RGB images to simulate an RGB image under uncontrolled lighting conditions, and FIG. 5D shows a corresponding combined infrared image 500D of the subject of FIG. 5C. In the example shown in FIGS. 5C and 5D, combined OLAT RGB image 500C includes regions with shadows (e.g., shadows B) that may have been caused, for example, by uneven lighting. The corresponding combined OLAT infrared image 500D shows fewer corresponding regions with shadows or at least that the corresponding regions have shadows that are less intense than in combined OLAT RGB image 500C.

Figure 5F:
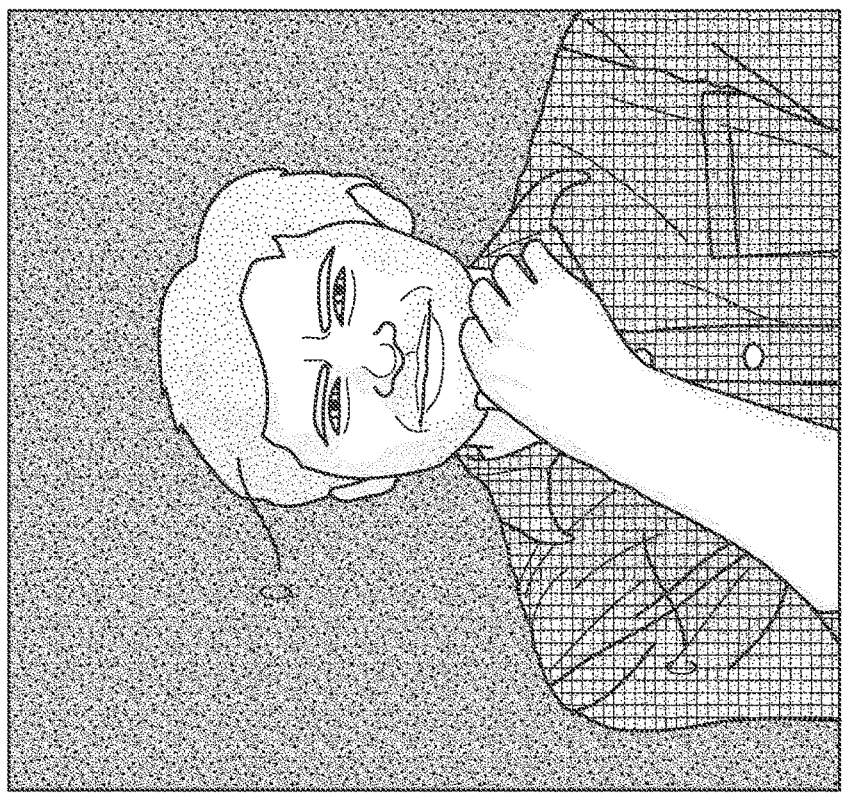
Figure 5E:
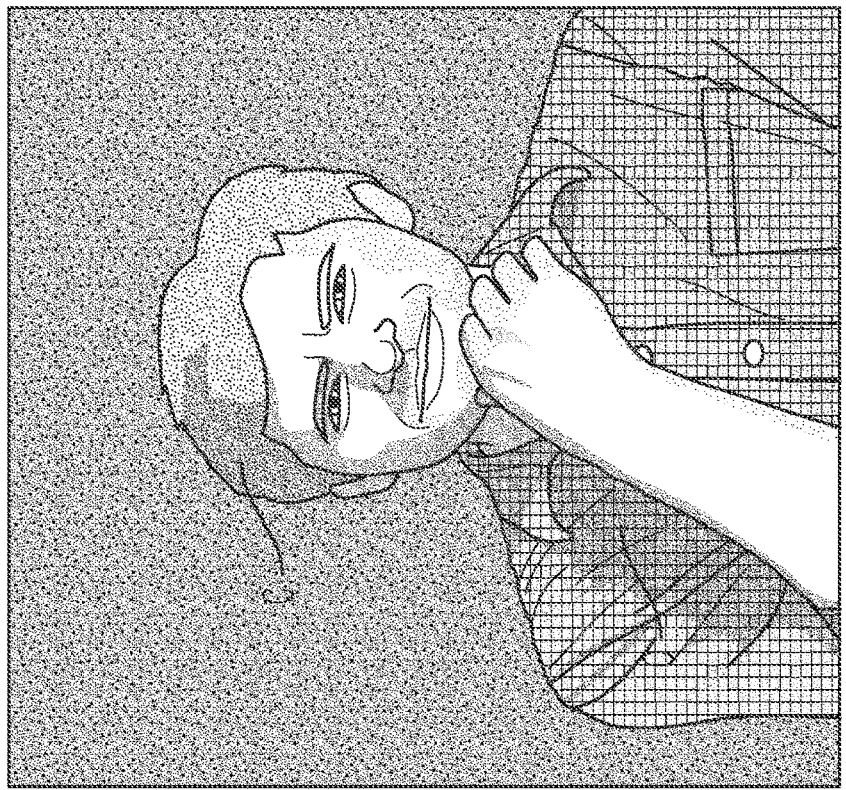

FIG. 5E shows an example, a target canonical RGB image of the subject of FIG. 5C obtained under a canonical set of visible lights. In the example shown, target OLAT RGB image 500C includes regions with shadows (e.g., shadows C). However, shadows (e.g., shadows B) seen on the wall behind the subject in combined OLAT RGB image 500C (FIG. 5C) are lessened. FIG. 5F shows a relighted RGB image 500F obtained by processing combined RGB image 500C (FIG. 5C) and combined infrared image 500D (FIG. 5E) through the neural network shows that relighted RGB image 500F has an appearance comparable to that of target OLAT RGB image 500C.

Figure 6A:
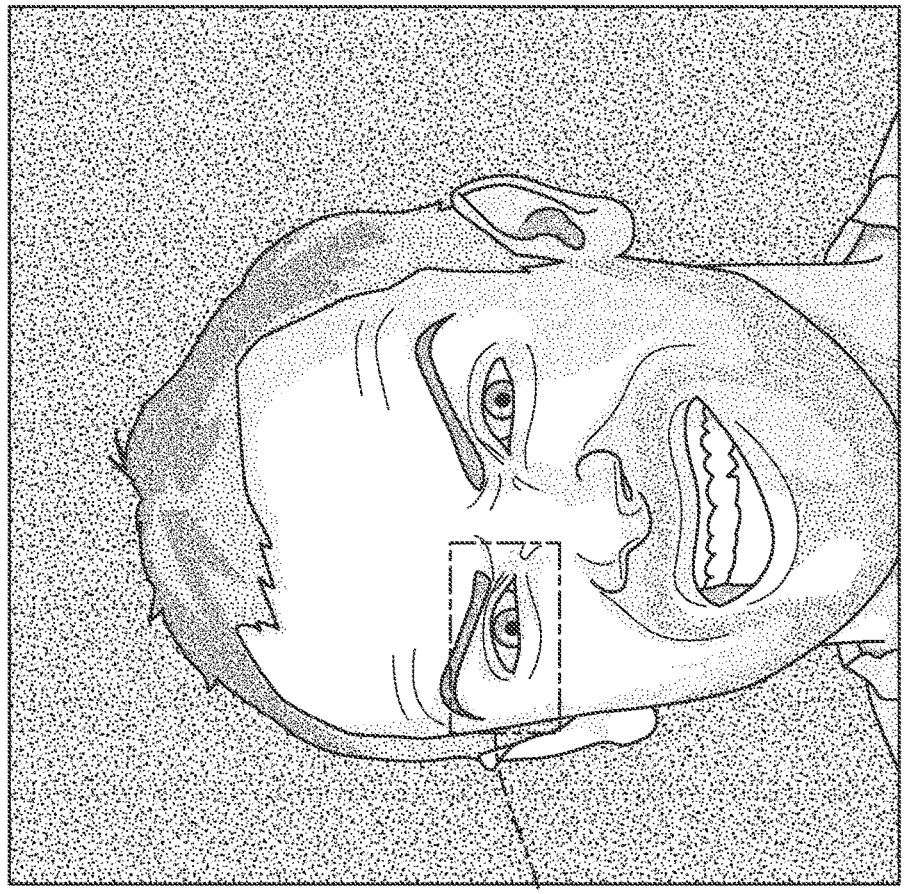
Figure 6B:
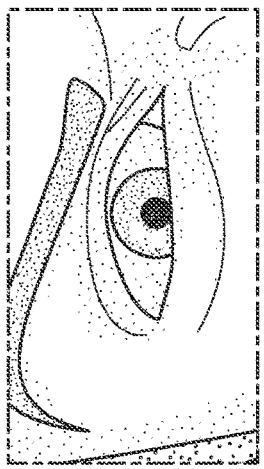
Figure 6C:
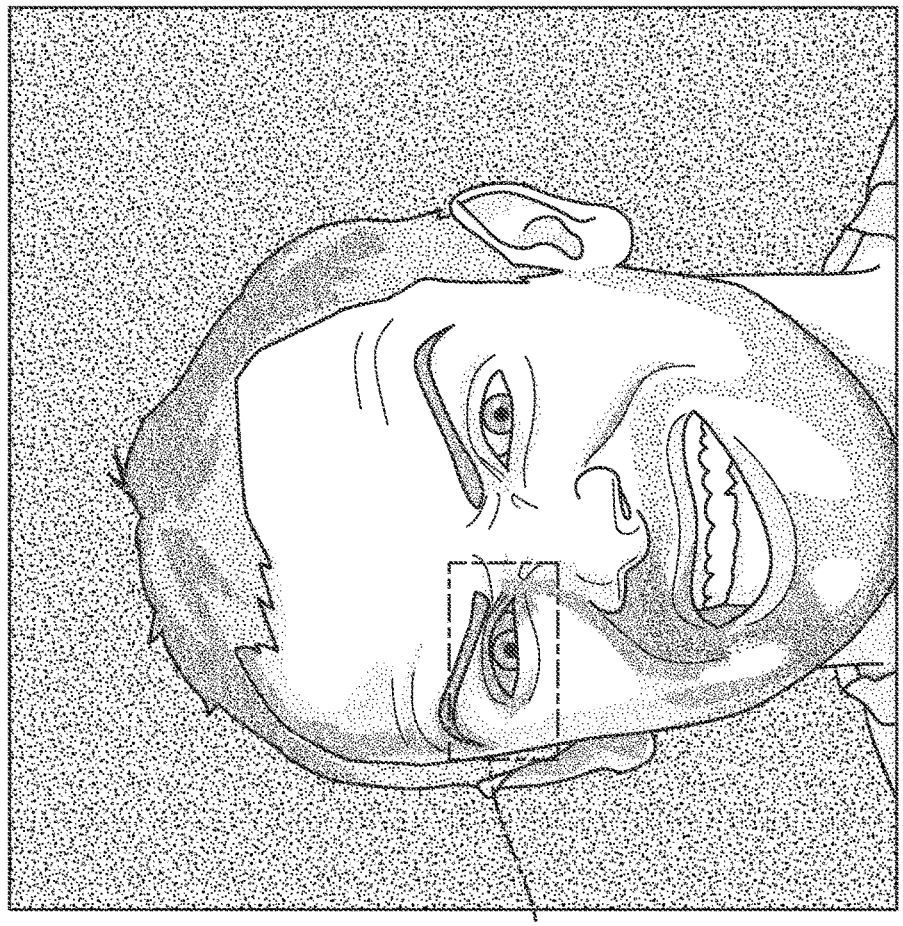
Figure 6D:
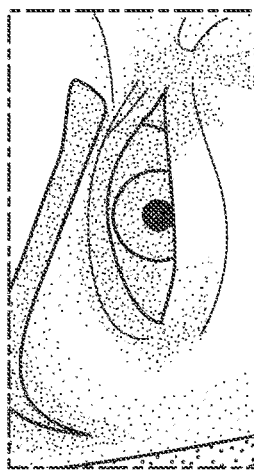

FIG. 6A shows, for example, an infrared image 600A of a subject that may be included in the set of training data images, and FIG. 6B shows, for example, an exploded view of a right eye region of infrared image 600A; FIG. 6C shows, for example, an RGB image 600C of the subject of FIG. 6A obtained in an uncontrolled lighting environment, and FIG. 6D shows, for example, an exploded view of a right eye region of RGB image 600C; FIG. 6E shows, for example, a target canonical RGB image 600E of the subject of FIG. 6A obtained under the canonical set of visible lights, and FIG. 6F shows, for example, an exploded view of a right eye region of target canonical RGB image 600E; and FIG. 6G shows, for example, a relighted RGB image 600F obtained by processing infrared image 600A and RGB image 600C through the neural network, and FIG. 6G shows, for example, an exploded view of a right eye region of relighted RGB image 600F.

As may be noted by visual inspection of FIGS. 6A through 6G, the subject's eyes shown in infrared image 600A and RGB image 600C lack the sparkle (e.g., sparkle E) seen in the subject's eyes shown in target canonical RGB image 600E. However, the trained neural network is able to synthesize or restore the plausible specular highlights (e.g., eyes) in relighted RGB image 600F obtained by processing infrared image 600A and RGB image 600C. The synthesized and restored specular highlights (e.g., sparkle E in the eyes) are depicted, for example, in FIGS. 6F and 6G.

Figure 7:
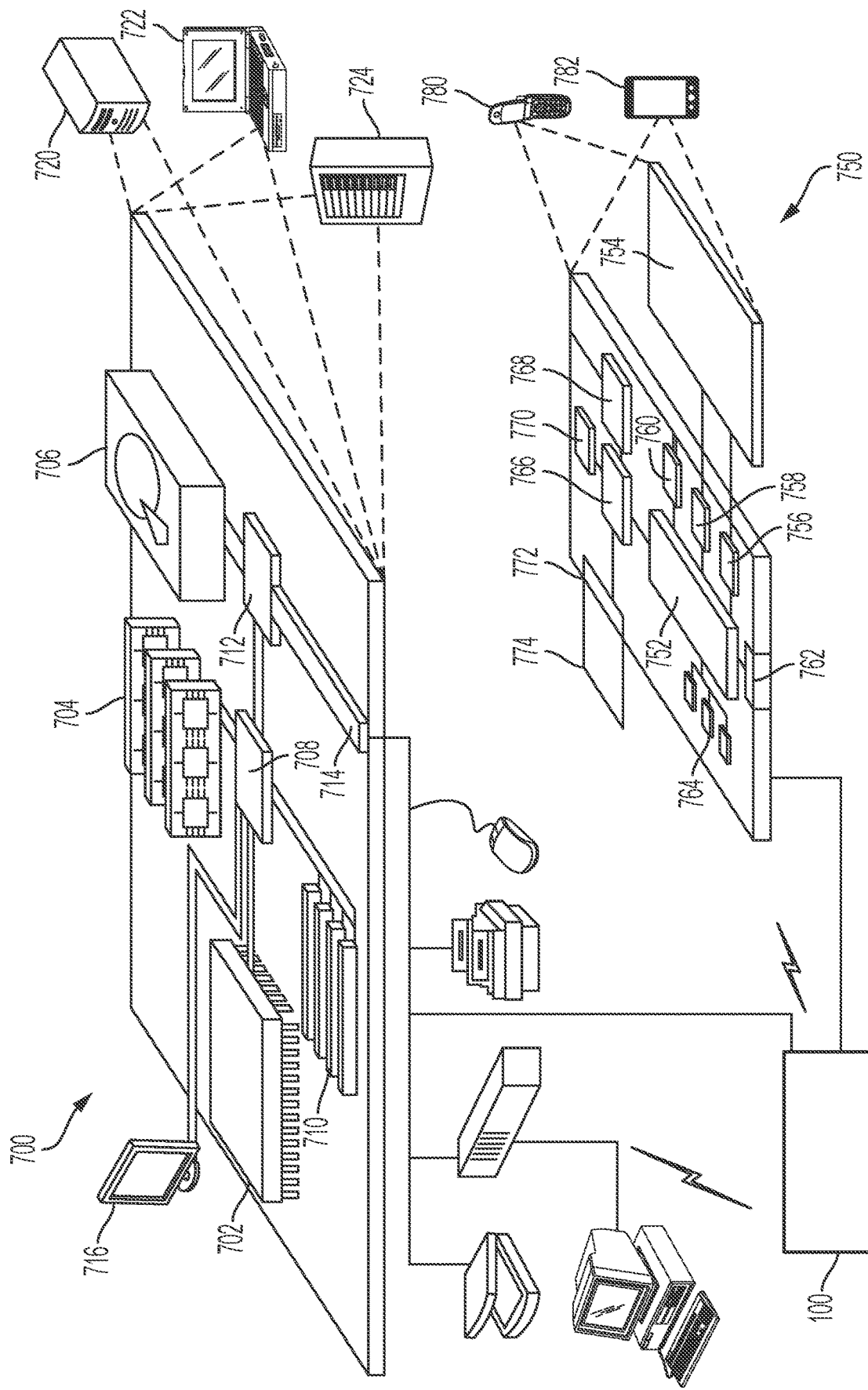
FIG. 7 illustrates an example of a computing device and a mobile computing device, which may be used with the techniques described here.

FIG. 7 shows an example of a computer device 700 and a mobile computer device 750, which may be used with imaging system 100 (and consumer electronic devices such as smart glasses that may incorporate components of imaging system 100), and with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In some implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid-state memory device, or an array of devices, including devices in a storage area network or other configurations. The computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is exemplary only. In some implementations, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 752, 754, 764, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, to enable near area communication of device 750 with other devices. External interface 762 may provide, for example, for wired communication in some implementations, or for wireless communication in some implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In some implementations, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation In some or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations s only and is not intended to be limiting of example implementations. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device or mobile electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

What is claimed is:

1. An imaging system, comprising:
a visible light camera configured to record a first image of a scene;
an infrared camera configured to record a second image of the scene;
a processor; and
a memory,
the processor configured to execute instructions stored in the memory to input the first image and the second image into a neural network, the neural network performing image segmentation on the first image and the second image to generate a segmented first image and a segmented second image and relighting the segmented first image, based on characteristics of the segmented second image, to output an image of the scene under canonical illumination conditions, wherein:
the canonical illumination conditions include a key light, a fill light, and a back light of a three-point lighting setup, and
the neural network was trained by processing pairs of visible light and infrared images of a training scene from a set of training images through the neural network.

2. The imaging system of claim 1, further comprising: an infrared light source configured to illuminate the scene with infrared illumination.

3. The imaging system of claim 2, wherein the infrared light source is collocated with the infrared camera.

4. The imaging system of claim 1, wherein the visible light camera and the infrared camera are collocated and have a same or overlapping fields of view.

5. The imaging system of claim 1, wherein the processor is configured to operate the visible light camera and the infrared camera to record the first image and the second image simultaneously in a single exposure period.

6. The imaging system of claim 1, wherein the neural network is a convolutional neural network.

7. The imaging system of claim 6, wherein the convolutional neural network includes a U-Net.

8. The imaging system of claim 1, wherein the neural network relights the segmented first image by at least one of:
removing shadows;
removing specular artifacts; or
synthesizing specular features.

9. A computer-implemented method, comprising:
receiving a red-green-blue, RGB, image of a scene recorded by an RGB camera in a lighting environment;
obtaining an infrared image of the scene recorded by an infrared camera under infrared light illumination of the scene,
inputting both the RGB image and the infrared image of the scene into a neural network, the neural network performing image segmentation on the RGB image and the infrared image to generate a segmented RGB image and a segmented infrared image and relighting the segmented RGB image based on characteristics of the segmented infrared image of the scene to correspond to a relighted RGB image obtained under canonical illumination conditions, wherein:
the canonical illumination conditions include a key light, a fill light, and a back light of a three-point lighting setup, and
the neural network was trained by processing pairs of visible light and infrared images of a training scene from a set of training images through the neural network; and
receiving the relighted RGB image as an output of neural network.

10. The method of claim 9, wherein the neural network relights the segmented RGB image by at least one of:
removing shadows;
removing specular artifacts; or
synthesizing specular features.

11. The method of claim 9, wherein obtaining the infrared image of the scene includes collocating the RGB camera and the infrared camera.

12. The method of claim 11, wherein obtaining the infrared image includes recording the infrared image simultaneously as a recording of the RGB image of the scene by the RGB camera.

13. The method of claim 9, wherein the neural network was trained by further:
providing a light stage including multiple light sources to controllably illuminate scenes;
providing a camera system including a visible light camera and an infrared camera to capture images of the scenes under controlled illumination conditions;
recording the set of training images using the camera system for training the neural network;
processing the pairs of visible light and infrared images of the scene from the set of training images through the neural network to produce a relighted red-green-blue, RGB, image of the scene as an output image of the scene; and
comparing the relighted RGB image for the scene with a target canonical RGB image of the scene, and adjusting neural network parameters to reduce differences between the relighted RGB image for the scene and the target canonical RGB image of the scene.

14. A method for training a neural network to relight visible light images, the method, comprising:
providing a light stage including multiple light sources to controllably illuminate scenes;
providing a camera system including a visible light camera and an infrared camera to capture images of the scenes under controlled illumination conditions;
recording a set of training data images using the camera system for training the neural network, processing a pair of visible light and infrared images of a scene from the set of training data images through the neural network by performing image segmentation on the pair of visible light and infrared images to generate a segmented visible light image and a segmented infrared image and to produce a relighted red-green-blue, RGB, image of the scene as an output image of the scene; and
comparing the relighted RGB image for the scene with a target canonical RGB image of the scene, and adjusting neural network parameters to reduce differences between the relighted RGB image for the scene and the target canonical RGB image of the scene, wherein the target canonical RGB image of the scene corresponds to an image of the scene obtained under canonical illumination conditions that include a key light, a fill light, and a back light of a three-point lighting setup.

15. The method of claim 14, wherein recording the set of training data images includes adjusting the multiple light sources in the light stage to correspond to a canonical lighting environment for the scene, and recording the target canonical RGB image of the scene.

16. The method of claim 14, wherein recording the set of training data images using the camera system includes turning on the multiple light sources in the light stage, one-by-one, and recording pairs of one-light-at-a-time, OLAT, RGB images and OLAT infrared images of the scene.

17. The method of claim 16, further comprising combining a first OLAT RGB image of a scene obtained under illumination from one light source with a second RGB image or images obtained under illumination from a second light source or light sources to simulate a combined RGB image of the scene.

18. The method of claim 16, further comprising combining all OLAT RGB images of a scene obtained under illumination from one light source may be combined with an RGB image or images obtained under illumination from other light sources to simulate a combined RGB image.

19. The method of claim 14, wherein recording the set of training data images using the camera system includes recording RGB images and infrared images of a plurality of different scenes.

20. The method of claim 14, wherein adjusting the neural network parameters to reduce differences between the relighted RGB image for the scene and the target canonical RGB image of the scene involves evaluating a perceptual loss function.

21. The method of claim 14, wherein adjusting the neural network parameters to reduce differences between the relighted RGB image for the scene and the target canonical RGB image of the scene involves evaluating a least absolute error (L1) function.

* * * * *